United States Patent [19]
Henoch

[11] 3,739,263
[45] June 12, 1973

[54] CROSS-SECTIONAL AREA MEASURING DEVICE

[75] Inventor: Bengt Henoch, Alvsjo, Sweden

[73] Assignee: Institutet for Mikrovagsteknik, Stockholm, Sweden

[22] Filed: Sept. 27, 1971

[21] Appl. No.: 183,946

[30] Foreign Application Priority Data
Sept. 30, 1970 Sweden.............................. 13233/70

[52] U.S. Cl.............................. 324/58.5 C, 324/54
[51] Int. Cl........................................... G01r 27/04
[58] Field of Search.............. 324/58.5 C, 54, 58 C, 324/61 QS

[56] References Cited
UNITED STATES PATENTS
2,548,598   4/1951   Feiker, Jr........................ 324/58.5 C
3,458,808   7/1969   Agdur............................. 324/58.5 C FOREIGN PATENTS OR APPLICATIONS
1,106,185   3/1968   Great Britain................. 324/58.5 C Primary Examiner—Stanley T. Krawczewicz
Attorney—Hane, Baxley & Spiecens

[57] ABSTRACT

A device for measuring the cross-sectional area of an object such as a wire includes a resonant cavity through which the object passes. The resonant cavity is energized by a signal whose frequency periodically varies over a range which includes two distinct resonant modes of the cavity. By virtue of the passage of the object through the cavity both resonance frequencies change as a function of the cross-section of the object and the difference between these two resonance frequencies is a measure of the cross-section of the object.

8 Claims, 6 Drawing Figures

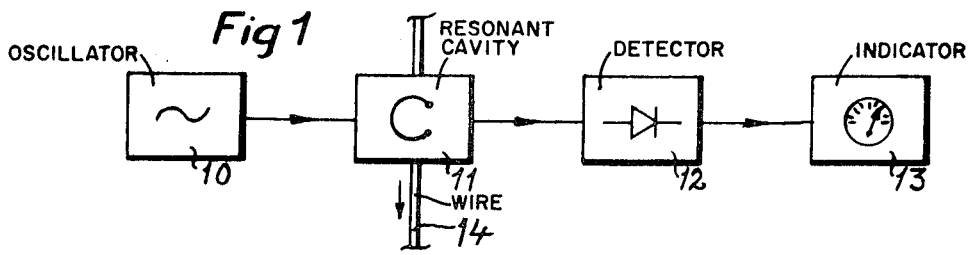
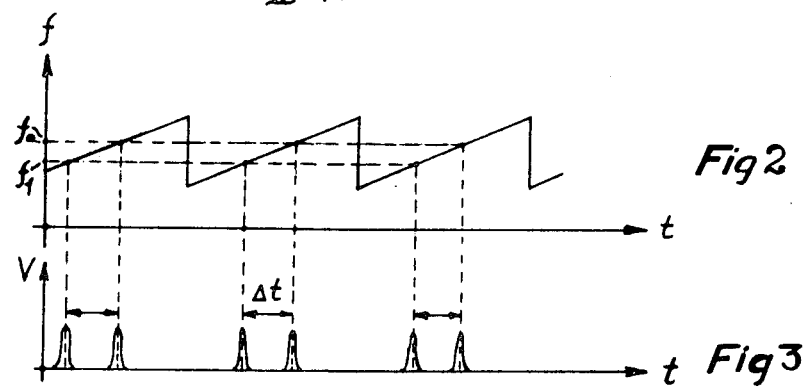
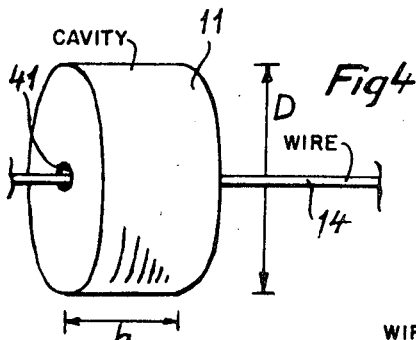
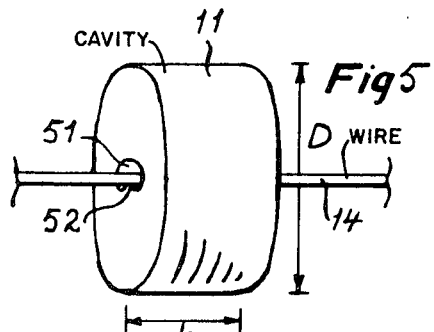
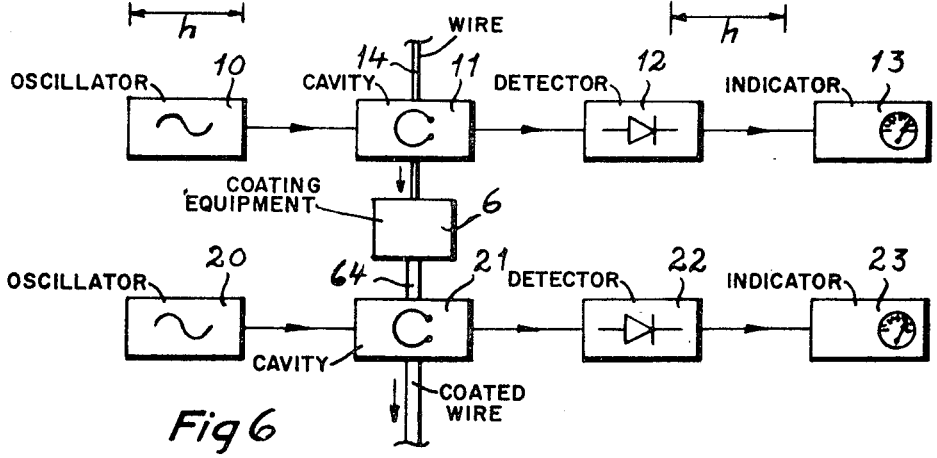

CROSS-SECTIONAL AREA MEASURING DEVICE

This invention relates to a device for the continuous measurement and/or monitoring of the cross sectional area of an object of large longitudinal dimension. An object of the invention is to provide a device that is easy to make and operate and reliable for measurement and monitoring in conjunction with manufacturing processes for drawn wire, girders, electrical wiring, tubing etc. The characteristic features of a device in accordance with the invention are specified in the appended claims.

The invention will be described in greater detail in conjunction with the accompanying drawing, in which FIG. 1 shows diagrammatically the units comprised in the device in accordance with the intention, FIGS. 2–3 show curves which make it easier to understood the description of the operation of the device according to FIG. 1, FIG. 4 shows an example of a cavity for no-contact measurement of the cross sectional areas of metallic objects of large longitudinal dimension, FIG. 5 shows an example of a cavity for the in-contact measurement of the cross sectional areas of metallic objects of large longitudinal dimension, and FIG. 6 shows a device for the no-contact measurement of the thickness of the dielectric layer on metallic objects of large longitudinal dimension.

The device according to FIG. 1 comprises an oscillator 10 which is designed to emit a high-frequency electrical signal whose frequency exhibits a periodic variation as shown in FIG. 2, an electrical cavity 11 with distinct resonance characteristics, which cavity has openings for the passage through it of metallic objects 14 of large longitudinal dimension such as a metal wire, a detector 12 which incorporates circuits for processing of the signals, and an indicator circuit 13 for indication of the cross sectional area of the metallic object 14 of large longitudinal dimension on the basis of the energy transmission through the cavity 11.

The high-frequency signal from the oscillator 10 is fed into the cavity 11 which has distinct resonance characteristics for the energy of two separate modes of oscillation with resonant frequencies $f_o$ and $f_1$ respectively, and is otherwise constructed in such a way that if a metallic object 14 of large longitudinal dimension, e.g. a metal wire, is made to pass through the cavity, the resonant frequency $f_o$ increases as the cross sectional area of the metallic object 14 increases, and the resonant frequency $f_1$ decreases as the cross sectional area of the metallic object 14 increases. The curve in FIG. 3 represents the output voltage V as the function of time $t$ at the output side of the cavity. This output voltage is processed in a known manner so that a signal is formed which provides a measure of the difference in time or frequency between the resonant frequencies $f_o$ and $f_1$. This signal is fed into the indicator unit 13 which is designed and calibrated in such a way that it gives a reading, e.g. in millimeters, showing the diameter of a circular metal wire.

The cavity 11 is a cavity with metallic walls. The resonant frequencies for the different modes of oscillation are a function of the volume of the cavity. If a metallic object is introduced into such a cavity, the volume of the cavity diminishes. The alteration in the resonant frequency is a function of the ratios of the energies of the mode of oscillation in that part of the cavity in which the diminution in volume occurs. If the mode of oscillation has mainly magnetic energy where the diminution in volume occurs, the resonant frequency will increase, and if the mode of oscillation has mainly electrical energy where the diminution in volume occurs, the resonant frequency will decrease.

FIG. 4 shows an example of the construction of the cavity 11, a cavity of symmetrical circular cylindrical section, which is provided with openings (of which one can be seen at 41 for the passage through it of the metallic object along the line of symmetry of the cavity where the mode of oscillation (a $TM_{110}$ mode) associated with the resonant frequency $f_o$ sets up a high-frequency magnetic field at right angles to the longitudinal direction of the metallic object, and where the mode of oscillation (a $TE_{111}$ mode) associated with the resonant frequency $f_1$ has mainly electrical energy in that part of the cavity through which the metallic object passes. The ratio between the diameter D and height $h$ of the cavity can be chosen so that the resonant frequencies $f_o$ and $f_1$ are situated near one another ($D/h = 2.15$). The resonant frequencies $f_o$ and $f_1$ will then be found around the frequency $36.6/D$ GHz, where D is the dimension in cm. This cavity is suited for measurement of the diameter of metal wires greater than 0.3 mm. The cavity 11 may also be made with a cavity cross section other than circularly cylindrical, e.g. square.

FIG. 5 shows an example of the construction of the cavity 11, a cavity of symmetrical circular cylindrical section, which is provided with openings (of which one can be seen at 51 for the passage through it of the metallic object 14 along the line of symmetry of the cavity, there being metallic contact at 52 between the cavity and the metallic object. The object is pressed against the sliding surface 52 in such a way that perfect contact is secured, e.g. by means of a pair of rollers which are not shown. The mode of oscillation (a $TM_{010}$ mode) associated with the resonant frequency $f_o$ sets up a high-frequency electrical field in the longitudinal direction of the metallic object. If the metallic object is in metallic contact with the cavity, the metallic object acts as an inductance connected in parallel with a parallel resonance circuit. The resonant frequency $f_o$ exhibits a marked increase already at small cross sectional areas or diameters. The mode of oscillation (a $TE_{111}$ mode) associated with the resonant frequency $f_1$ has mainly electrical energy in that part of the cavity through which the metallic object passes. The ratio between the diameter D and height $h$ of the cavity can be chosen so that the resonant frequencies $f_o$ and $f_1$ are situated near one another ($D/h = 1.0$). The resonant frequencies $f_o$ and $f_1$ will then be found around the frequency $23.1/D$ GHz, where D is the dimension in cm. This cavity is suited for measurement of the diameters of metal wires less than 2 mm and down to a few $\mu$(microns). The cavity 11 may also in this case be made with a cavity cross section that is not circular cylindrical.

FIG. 6 shows a device for measurement of the thickness of the dielectric layer on metal wires. The device comprises the devices in accordance with FIG. 1, viz. the device 10–11–12–13 which measures the diameter of the metal wire prior to its being coated in the equipment 6, and a device 20–21–22–23 which measures an equivalent diameter after the coating operation. The thickness of the layer is obtained as a function of the difference between these two measurements. The device 10—11—12—13 in front of the coating operation comprises an oscillator 10, an electrical cavity 11 intended for the metal wire 14 and constructed e.g. according to FIG. 4, a detector 12 and an indicator circuit 13. The device 20-21-22-23 beyond the coating operation comprises an oscillator 20, an electrical cavity 21 intended for the coated metal wire 64 and constructed e.g. according to FIG. 4, a detector 22 and an indicator circuit 23.

A device in accordance with the invention should be particularly suitable within the working range $0.5 < D/h < 3.0$, the design without electrical contact being specially suitable within the interval $2.0 < D/h < 2.3$ and the design with electrical contact being specially suitable within the interval $0.8 < D/h < 1.2$.

In the foregoing, the invention has been described with particular reference to objects of metal or objects coated with a dielectric substance. The invention is not, however, restricted to this kind of object (wire, insulated electric wiring) but may be utilized for many other objects which are capable of affecting electromagnetic propagation in microwave cavities.

I claim:

1. A device for the continuous measurement and/or monitoring of the cross-sectional area of an object having a longitudinal dimension which is very much larger than a transverse dimension comprising: a source of microwave electrical energy having a frequency periodically varying within a given frequency range; a microwave resonator cavity which is in the form of a symmetrical circular cylinder having closed ends and being provided with an opening in each of said ends at the axis of symmetry of the cylinder whereby the object can pass through said cavity, said cavity having such dimensions so as to have distinct resonance characteristics for energy of two separate modes of oscillation which have properties such that the resonant frequency of one mode of oscillation increases as the cross-sectional area of the object increases, and the resonant frequency of the other mode of oscillation decreases as the cross-sectional area increases, and means for measuring the difference between the two resonant frequencies, whereby the cross-sectional area of the object is obtained as a function of the difference between said two resonant frequencies.

2. A device in accordance with claim 1, characterized by the fact that the said cavity is constructed in such a way that one of the modes of oscillation sets up a high-frequency magnetic field at right angles to the longitudinal direction of the object, so that the resonant frequency of this mode of oscillation increases as the cross sectional area increases, and by the fact that the other mode of oscillation in that part of the cavity through which the object passes has mainly electrical energy, so that the resonant frequency of this mode of oscillation decreases as the cross sectional area increases.

3. A device in accordance with claim 1, characterized by the fact that the said cavity is constructed in such a way that one of the modes of oscillation sets up a high-frequency electrical field in the longitudinal direction of the object, so that the resonant frequency of this mode of oscillation increases as the cross sectional area increases, and by the fact that the other mode of oscillation in that part of the cavity through which the object passes has mainly electrical energy, so that the resonant frequency of this mode of oscillation decreases as the cross sectional area increases, and by the fact that passage of the object through the cavity is designed so that there is electrical contact between this and the cavity.

4. A device in accordance with claim 2 for the continuous measurement and/or monitoring of the thickness of the dielectric layer on a metallic object of large longitudinal dimension, characterized by the thickness of the layer being obtained as a function of the difference between two measurements of the said frequency difference, viz. one in a first cavity for the metallic object alone and the other in a second cavity for the metallic object with the dielectric layer applied to it.

5. A device in accordance with claim 2 wherein the ratio between the diameter D and height $h$ of the cavity is equal to 2.15, and said frequency range is situated around $36.6/D$ GHz, where D is measured in cm.

6. A device in accordance with claim 3 wherein the ratio between the diameter D and height $h$ of the cavity is approximately equal to 1.0, and said frequency range is situated around $23.1/D$ GHz, where D is measured in cm, and the passage of the object through the cavity is designed so that there is electrical contact between this and the cavity.

7. A device in accordance with claim 2 wherein the ratio between the diameter D and height $h$ of the cavity is less than 2.3 and greater than 2.0, and the passage of the object through the cavity is designed to occur along the line of symmetry of the cavity in such a way that there is no electrical contact between the object and the cavity.

8. A device in accordance with claim 9, wherein the ratio between the Diameter D and height $h$ of the cavity is less than 1.2 and greater than 0.8, and the passage of the object through the cavity is designed to occur along the line of symmetry of the cavity in such a way that there is electrical contact between this and the cavity.

* * * * *